Patented Aug. 9, 1927.

1,638,278

UNITED STATES PATENT OFFICE.

WALTER O. SNELLING, OF ALLENTOWN, PENNSYLVANIA.

CONTACT-RECTIFYING DEVICE.

No Drawing.   Application filed February 8, 1923. Serial No. 617,841.

My invention relates to contact rectifying devices of the general nature of natural crystal detectors, and more particularly relates to improvements in contact rectifiers, electric valves, contact detectors and like devices having the property of detecting electromagnetic waves, and of modifying the currents set up by ether waves or other radiant energy.

It has long been known that the electrical conductivity of certain natural minerals varies with the direction in which the electrical current passes through the mineral, and with the intensity and duration of the applied electro-motive force. This property has been referred to as "uni-directional" conductivity, but may be more properly called selective conductivity or valve action, since in many cases the selective action made use of in the detection of radiant energy is not the directional factor at all, but is rather the variation in response of the contact element to changes in the intensity of the applied electrical pressure.

The fact that many natural minerals show selective electrical conductivity has caused efforts to be made to prepare synthetic products having the same effect. On preparing the corresponding sulfides, selenides, tellurides and arsenides of metals known to possess current rectifying properties as the naturally occurring crystals, by fusing together the metal and the non-metallic component, products have been obtained which possess fair rectifying properties. It is known for example, that by melting together a mixture of lead and sulfur to form lead sulfide, the fusion mass obtained possesses current rectifying properties which are approximately equal to the current rectifying properties of natural galena.

Efforts up to this time to produce current rectifying bodies by the wet precipitation of the sulfides, selenides, tellurides and arsenides of metals have not been so successful however, and although the sulfides of several metals, prepared by the precipitation of solutions of salts of the metal by means of hydrogen sulfide have given products of slight rectifying property, in no case has an artificial product produced by a wet reaction possessed sufficient sensitiveness to be of commercial importance.

I have discovered a procedure by means of which contact rectifying products may be obtained by wet precipitation methods, my products possessing greatly improved sensitiveness and selectivity. The products obtained by the practice of my new invention are not only greatly superior to the products previously obtained by wet precipitation methods, but in many cases are superior to the corresponding natural minerals.

As an example of my present invention, I will describe a process which I may employ in preparing contact rectifying products by the wet precipitation of lead sulfide. I first precipitate a solution of any suitable salt of lead, such as the nitrate or acetate by means of hydrogen sulfide or a suitable alkali sulfide by the well known methods of chemistry. After drying, the amorphous precipitate of lead sulfide possesses only very feeble rectifying or detecting properties. I now compress this precipitate, by means of a suitable hand press or mechanical press, preferably employing a pressure in excess of 200 kilos per sq. centimeter. The compressed product so obtained possesses somewhat better rectifying properties than the dried precipitate before compression, but is still too insensitive to form a satisfactory commercial contact rectifier. I next treat or condition the pellet or block obtained by my compressing operation, preferably employing a temperature corresponding to dull redness, and preferably employing a time of treatment of about one or two minutes, avoiding excessive oxidation during this heating or conditioning step. As a result of this treating or conditioning of the compressed block or pellet it undergoes a change of color and of electrical conductivity, and after cooling will be found to possess good rectifying properties.

The above example represents the simplest form of my present invention, and gives products that are much superior to any products previously obtained by wet precipitation methods. By suitable modifications of the above procedure however, I have found it possible to obtain materially improved sensitiveness, as compared with the results of the simple procedure described.

In my pending applications S. N. 615,160 and S. N. 617,173 I have described improved current rectifying elements made by reactions at elevated temperatures between the oxide compounds of metals and suitable non-metallic elements, and certain forms of my present invention represent in part the application of the principles of my prior inventions to the preparation of current rectifying elements by wet or precipitation reactions.

I find, for example, that by mixing from a few percent up to 50% or more of sulfur with the precipitated lead sulfide before my compressing or briquetting operation, I can obtain a desirable modification and control of the density, the electrical conductivity and the current rectifying characteristics of my final product. By admixing a few percent of lead oxide with precipitated lead sulfide and sulfur before my compressing or briquetting operation I also obtain modified products possessing increased selectivity.

When sulfur or equivalent material is admixed with a pulverulent reaction product of a metal and a non-metallic component, and the mixture is heated, the cementation of the particles of the pulverulent material occurs. It is probable that this is due in part to the action of the free sulfur or equivalent material in dissolving the sharp edges of adjacent particles of the pulverulent product, these surfaces of contact then consolidating or blending together. Some chemical reaction also occurs between the particles of the finely divided material, however, particularly when an active agent such as sulfur or selenium, or products of these materials, are used as cementing agents, and the final product obtained by the practice of my invention is an integral mass or block, of porous nature, adjacent particles being in some cases fused together and in other cases being chemically blended together by mutual chemical action, but in all cases being consolidated to a single integral mass of material.

Although I have referred to precipitated lead sulfide as a material which I may use in the practice of my present invention, my invention is not limited to the use of this material, but on the contrary I have found that my invention is widely applicable to the preparation by wet methods of compounds possessing selective conductivity, and for the most part corresponding to minerals of known contact rectifying characteristics, although in general I obtain the most satisfactory results by the use of heavy metals such as lead and bismuth, and elements of the sulfur group such as sulfur and selenium. The results obtained from such metals as copper, silver, iron and molybdenum, and such non-metallic elements as tellurium and arsenic are in general less satisfactory, but this is to be expected in view of the known fact that a somewhat similar relationship exists in the case of the naturally occurring minerals.

The essential feature of my present invention is the consolidation of precipitates obtained by wet reactions between metal and non-metallic components, or equivalent materials in pulverized or finely divided condition, by sintering or heating to incipient fusion, or by chemical reactions having a cementing action, to form as a final product an integral block of porous nature which is not a mere aggregation of granular or powdery particles.

My invention is broadly applicable to the preparation of a great number of sulfides, selenides, tellurides and arsenides possessing current rectifying characteristics. Although I prefer to employ as my metal element the heavy metals such as lead and bismuth, I find that many other metals may be used for the production of bodies having current rectifying characteristics, and in general I find that by the application of my invention I am able to prepare contact rectifying bodies corresponding to the principal mineral sulfides, selenides, tellurides and arsenides possessing current rectifying characteristics.

Although in the practice of my present invention I prefer to make use of the principles of controlling density and the current conducting properties described in my prior applications S. N. 615,160 and S. N. 617,173, yet these do not form an essential feature of my present invention, which broadly comprises methods of improving the current rectifying characteristics of amorphous precipitates and finely divided solids by consolidating such precipitates until an integral mass of material is produced by the fusion or chemical cementation of the individual particles originally present in the granular or pulverulent raw material and by heating the consolidated products so obtained to a temperature sufficient to produce incipient fusion, but not sufficient to produce complete fusion.

It will be evident that a wide range of equivalents may be used in connection with my present invention, without departing from the spirit of the disclosure herein made. Although I have referred to certain examples as representing specific embodiments, my invention should not be considered as limited to the examples given, and no limitations should be imposed except such as are indicated in the appended claims.

I claim:

1. The process which comprises applying pressure to a finely divided reaction product of a metal with an element of the sulfur group until a coherent mass results, and thereafter sintering the resulting coherent product.

2. The process which comprises applying pressure to a finely divided reaction product of a metal with an element of the sulfur group until a coherent mass results, and thereafter heating the resulting coherent product at a sintering temperature until the material shows current rectifying properties.

3. The process which comprises applying pressure to a finely divided reaction product of a metal with an element of the sulfur group until a coherent mass results, and thereafter heating the resulting coherent product until incipient fusion occurs.

4. The process which comprises applying pressure to finely divided lead sulfide until a coherent mass results, and thereafter heating the resulting product at a sintering temperature.

In testimony whereof, I have hereunto subscribed my name this 6th day of February, 1923.

WALTER O. SNELLING.